United States Patent

[11] 3,590,723

| [72] | Inventors | Sophocles J. Dokos<br>Oak Park;<br>Joseph L. Vieceli, LaGrange; Moises B. Lorenzana, Glen Ellyn, all of, Ill. |
|---|---|---|
| [21] | Appl. No. | 752,684 |
| [22] | Filed | Aug. 14, 1968 |
| [45] | Patented | July 6, 1971 |
| [73] | Assignee | Sunbeam Corporation<br>Chicago, Ill. |

[54] COFFEE MAKER
1 Claim, 3 Drawing Figs.

[52] U.S. Cl. .................................................. 99/289, 99/71, 99/299
[51] Int. Cl. ............................................... A47j 31/00
[50] Field of Search ....................................... 99/65, 71, 287, 289, 290; 233/2, 20

[56] References Cited
UNITED STATES PATENTS

| 1,358,897 | 11/1920 | Tolman | 233/20 X |
| 1,869,720 | 8/1932 | Strand et al. | 99/289 X |
| 2,149,270 | 3/1939 | Burgess | 99/289 X |
| 2,517,073 | 8/1950 | Alvarez | 99/289 |
| 3,233,535 | 2/1966 | Fowlie | 99/289 |
| 3,282,703 | 11/1966 | Broadhurst | 99/71 |

FOREIGN PATENTS

| 1,303,836 | 8/1962 | France | 99/289 |
| 1,027,293 | 3/1966 | Great Britain | 233/20 |

*Primary Examiner*—Dennis E. Talbert, Jr.
*Attorney*—George R. Clark

ABSTRACT: A coffee maker having a brewing chamber with an upper and lower portion and including means for feeding a charge of heated water and coffee grounds therein plus means for rotating the chamber until nearly all of the coffee liquid is removed therefrom. After the coffee liquid is forced from the chamber, the upper and lower portions thereof separate to discharge relatively dry leached coffee grounds.

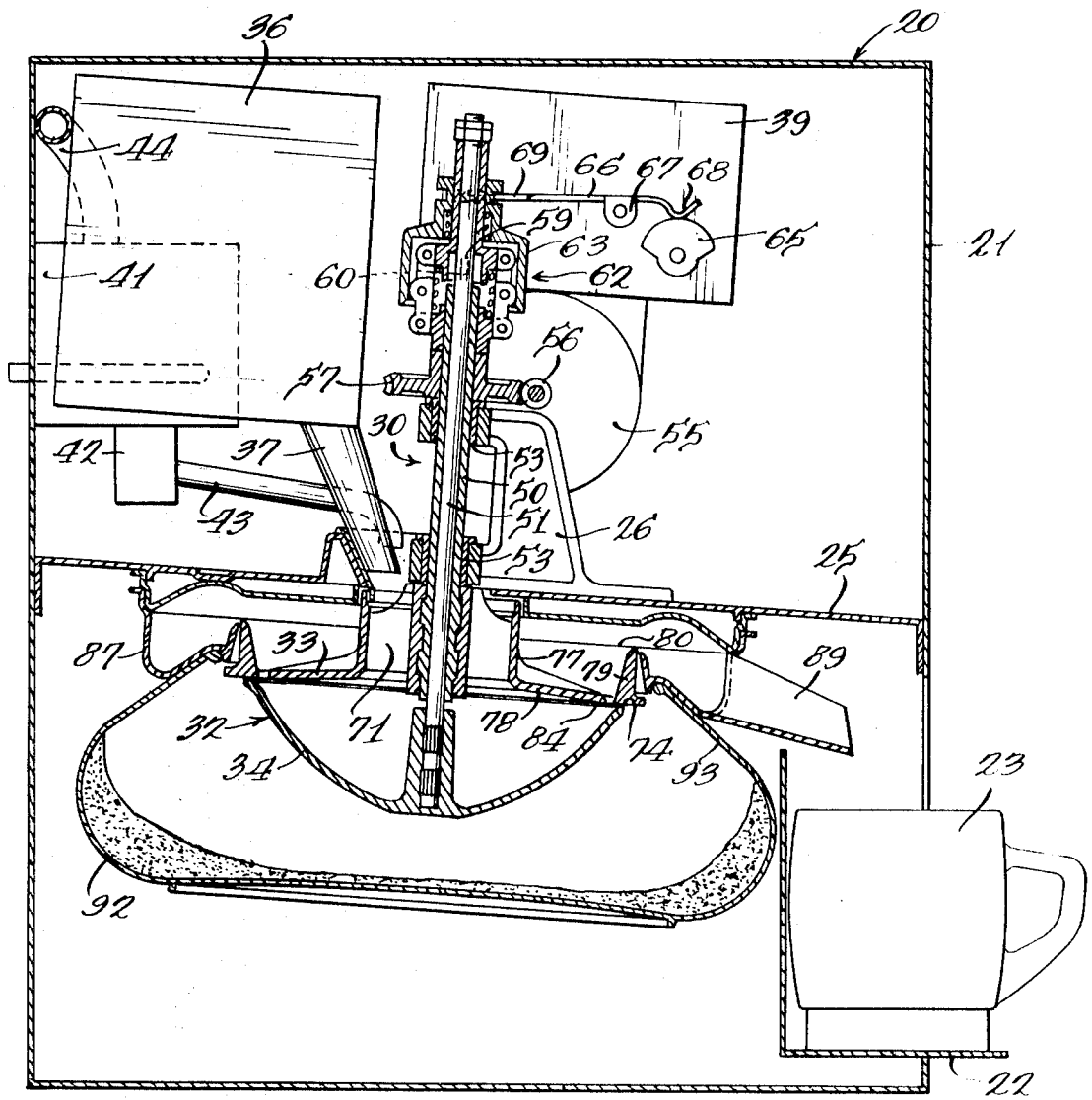

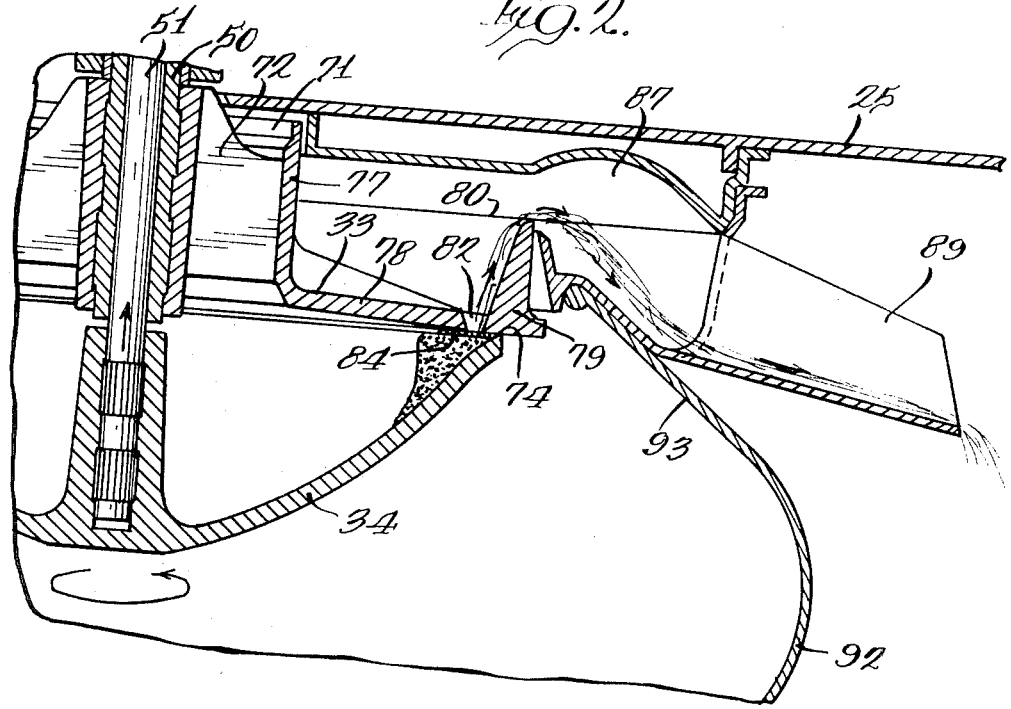
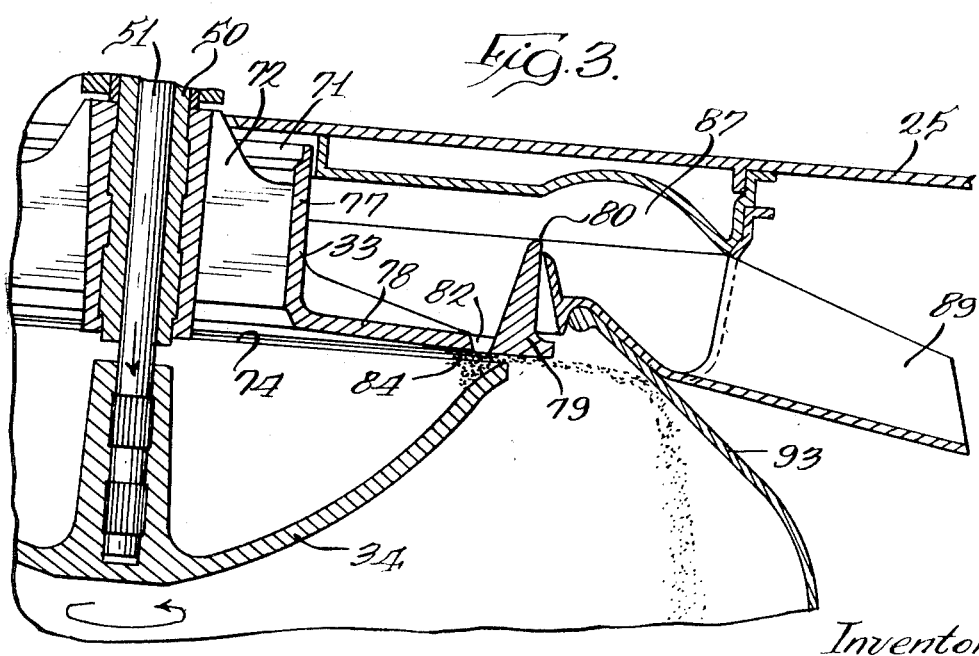

COFFEE MAKER

BACKGROUND OF THE INVENTION

Briefly, this invention relates to coffee makers and, more particularly, to electrically operated coffee makers having a rotatable brewing chamber into which heated water and coffee grounds are fed to brew a small batch of coffee, such as a single cup.

There has been a long recognized need for a coffee maker for home use which can efficiently brew a single cup of coffee at a time. Such a device would provide only the desired amount of coffee at a given time and would also permit the serving of a single cup of coffee between meals. Many housewives like to have a freshly brewed cup of coffee between meals, but coffee makers commonly found in the home cannot effectively make less than three or four cups of coffee in a single brewing cycle. Commercial vending machines have been developed which provide the consumer with a good cup of coffee which is individually brewed. It is appreciated that brewed coffee cannot be stored for a long period of time without a noticeable deterioration of flavor. In order to operate properly, commercial coffee vending machines are rather complicated and expensive, but such designs can easily be justified for a commercial unit since they are exposed to heavy usage and have frequent maintenance. Such commercial units are, obviously, not feasible for use in the home due to their high cost and maintenance requirements.

A single cup coffee maker for home use must have a simple design to minimize the cost thereof, and the unit should require very little servicing. An important requirement of this type of automatic coffee maker is adequate means for the storage and removal of spent coffee grounds. It is highly desirable that the coffee grounds, after the brewing cycle is completed, be in a relatively dry condition to facilitate their storage. If the spent coffee grounds are wet or in a slurry, an unpleasant odor may be generated, and the task of removing the slurry is messy and objectionable. An additional benefit is realized if nearly all of the coffee liquid is extracted from the leached coffee grounds due to the fact that less water is required to produce a single cup of coffee, and consequently, less water has to be heated, thereby reducing the cost of operating the coffee maker.

Another problem associated with the operation of an automatic single cup coffee maker for home use is the cleaning of the filter which is employed to separate the leached coffee grounds from the coffee liquid. Commercial coffee vending units can utilize either a complicated and expensive design to clean and purge the filter or have the unit serviced frequently by trained attendants. However, for use in the home, it would be advantageous for the single cup coffee maker to automatically clean the filter by a simple and inexpensive means.

SUMMARY OF THE INVENTION

Briefly, the present invention relates to a coffee maker having a rotatable brewing chamber including an upper and lower member into which is fed a charge of heated water and coffee grounds. The rotating of the chamber forces the charge to the periphery of the chamber where the coffee liquid is removed through discharge means. The continued rotation of the chamber results in the leached coffee grounds being in a relatively dry state whereafter the upper and lower members are separated causing the leached grounds to be hurled outwardly and discharged from the chamber.

A feature of the invention is a filter which is disposed over the discharge means to prevent the exit therethrough of coffee grounds, and the filter is oriented adjacent to the junction between the chamber members so that the discharging of the coffee grounds from the chamber causes the grounds to wipe against the filter thereby cleaning it.

Additionally, the brewing chamber is provided with an annular rim from which the coffee liquid is outwardly thrown due to the rotation of the chamber. This rim spaces the discharging liquid from the path followed by the discharging leached coffee grounds in order to facilitate the separation and handling of the coffee liquid and coffee grounds.

Therefore, it is an object of the present invention to provide a coffee maker having a rotatable brewing chamber wherein the chamber splits apart to discharge relatively dry leached coffee grounds.

Another object of the present invention is to provide a coffee maker with a rotatable brewing chamber having a filter which is automatically cleaned by leached coffee grounds wiping past it after the completion of the brewing operation.

Further objects and advantages of the present invention will become apparent as the following specification proceeds, and the features of novelty which characterize the invention will be pointed out with particularity in the claims annexed to and forming a part of the specification.

BRIEF DESCRIPTION OF THE DRAWINGS

For a better understanding of the present invention, reference may be had to the accompanying drawing in which:

FIG. 1 is a sectional view of a coffee maker embodying the present invention;

FIG. 2 is a fragmentary sectional view depicting the rotatable brewing chamber with the lower member thereof in the raised or closed position and illustrating the manner in which the coffee liquid is discharged from the chamber into the collecting ring spout; and FIG. 3 is a fragmentary sectional view similar to FIG. 2 but disclosing the brewing chamber with the lower member in the lower or open position discharging the leached coffee grounds into the waste basin.

DESCRIPTION OF THE PREFERRED EMBODIMENT

Referring to the drawing in which like numerals designate like parts throughout the several views, a single cup coffee maker is designated generally by the reference numeral 20. As can be seen in FIG. 1, the coffee maker 20 includes a housing 21 having a recessed platform 22 on which a coffee cup 23 can be placed for receiving coffee liquid. Within the housing 21 is a slightly inclined dividing wall 25 on which is secured a bracket 26 rotatably supporting a spindle assembly 30. At the lower end of spindle assembly 30 is circular brewing chamber 32 having an upper member 33 and a lower member 34. Inasmuch as the bracket 26 rotatably supports the spindle assembly 30 normal to the dividing wall 25, the spindle assembly is slightly angled.

For introducing coffee grounds into the brewing chamber 32, the automatic coffee maker 20 is provided with a coffee ground hopper 36 having a depending discharge chute 37 disposed to feed coffee grounds to the chamber. Within the hopper 36 is a mechanism (not shown) which automatically feeds a determined amount of coffee grounds to brew a single cup of coffee down the discharge chute 37 at a time regulated by a control unit 39. A flash heater 41 is located adjacent to the hopper 36 and has a valve 42 for permitting heated water to flow through pipe 43 which leads to a position where the water can fall into the brewing chamber 32. Water is supplied to the flash heater 41 by means of a suitable conduit 44 which can either be connected to a reservoir contained within the housing 21 or to a pressurized source such as a water spigot. Preferably, the flash heater 41 is electrically heated and has sufficient capacity to feed water at an excess of 200° F. to the brewing chamber. One suitable heater would have 1500 watts at 120 volts AC with a 6-ounce capacity. The valve 42 is electrically actuated and is regulated by control unit 39 to permit sufficient liquid to flow into the chamber 32 to brew a single cup of coffee. Both the hopper 36 and the flash heater 41 are positioned above the dividing wall 25 so that their contents can be fed by gravity into the brewing chamber 32 which is disposed below the dividing wall.

While the details of construction of the spindle assembly 30 are not an important part of the present invention, it should be appreciated that the spindle assembly includes a sleeve 50 which supports the brewing chamber upper member 33 and a shaft 51 slidably disposed within sleeve 50. The shaft 51 at its lower end is securely fastened to the brewing chamber lower member 34. Although the sleeve 50 is not permitted to move vertically, the shaft 51 can slide within the sleeve 50 to move the lower member 34 vertically with respect to the upper member 33. The sleeve 50 is rotatably supported by suitable bearings 53 in bracket 26. Positioned beneath the control unit 39 is an electric motor 55 having a drive worm gear 56 in driving engagement with gear 57 attached to the sleeve 50. In this manner, the motor 55 can rotate the spindle assembly 30 and brewing chamber 32. The operation of the motor 55 is regulated by the control unit 39.

Drivingly relating the sleeve 50 to the shaft 51 is a transversely extending shaft pin 59 which is received in a longitudinally extending sleeve slot 60. Thus, the sleeve 50 and shaft 51 always rotate together, but the shaft 51 is permitted to slide longitudinally with respect to the sleeve 50. Mounted to the sleeve 50 is a toggle mechanism 62 for moving the shaft 51 with respect to the sleeve 50. The details of the toggle mechanism 62 do not constitute a part of the present invention. Nevertheless, it should be appreciated that the toggle mechanism 62 includes the outer inverted cup-shaped cam element 63 which, when moved to its upper position, allows the toggle mechanism to force the shaft 51 downwardly wherein the pin 59 is moved to the bottom of sleeve slot 60 with the result that the brewing chamber lower member 34 is displaced downwardly from the brewing chamber upper member 33 or the brewing chamber is in an open position. On the other hand, when the cam element 63 is in its lower position as shown in FIG. 1, the toggle mechanism 62 forces the shaft 51 to its upper position wherein the shaft pin 59 is at the upper end of sleeve slot 60 and the lower member 34 is in engagement with the upper member 33 or the brewing chamber is in the closed position. To control the movement of toggle mechanism cam element 63, the control unit 39 includes a rotatable cam 65 which is in engagement with lever 66. As seen in FIG. 1, lever 66 has a central downwardly extending flange 67 which is pivotally mounted to the control unit 39. Furthermore, the lever 66 has a V-shaped end 68 engaging the cam 65 and has opposite end 69 in engagement with the cam element 63. Therefore, the pivotal movement of lever 66, which movement is regulated by control unit cam 65, governs the position of cam element 63.

In accordance with the present invention, the rotatable brewing chamber 32 has the upper member 33 formed with a central opening 71 through which the heated water from heater 41 and coffee grounds from hopper 36 are received. A plurality of radially extending vanes 72 extend across the opening 71 so that the member 33 will rotate with the sleeve 50. The heated water and coffee grounds introduced through the upper member central opening 71 are received within the cup-shaped lower member 34 having an annular upper edge 74 which is engageable with the upper member 33. Preferably, the coffee grounds and heated water are permitted to commingle a given period of time to permit steeping. Upon the rotation of the brewing chamber 32, the heated water and coffee grounds are forced near the periphery of the chamber adjacent to edge 74. Inasmuch as the lower member 34 has a curved bottom, the water and grounds are easily forced to adjacent edge 74 as depicted in FIG. 2.

As can be seen in FIGS. 2 and 3, the brewing chamber upper member 33 has a central upstanding portion 77 defining the opening 71 and vanes 72 and has a somewhat flat donut-shaped wall 78 at the outer end of which is an upwardly inclined rim 79. At the top of rim 79 is an annular releasing edge 80. A plurality of discharge openings 82 are defined in the upper member flat wall 78 immediately inside of and at the bottom of rim 79. The discharge openings 82 are closely spaced around the entire upper member 33. Preferably, the upper member 33 is molded from a suitable plastic and has attached to the underside of wall 78 a donut-shaped filtering screen 84 formed from plastic, such as nylon, which extends across the bottom of each discharge opening 82. The lower member edge 74 is relatively sharp so that when the edge 74 is pressed against the underside of upper member wall 78 along a circular line outside of the discharge openings 82, a seal will be established therebetween. As indicated hereinbefore, the rotation of the brewing chamber 32 causes the charge of heated water and coffee grounds to move to the periphery of the chamber. The continued rotation of the brewing chamber forces the liquid through the filtering screen 84 and discharge openings 82, up the outwardly inclined rim 79 and outwardly from the rim releasing edge 80. The union or junction between the upper and lower members is somewhat V-shaped with the discharge openings 82 being located near the apex of the V whereby the continued rotation of the brewing chamber forces nearly all of the liquid therefrom leaving the remaining coffee grounds, which cannot pass through the discharge openings 82 due to the screen 84, in a relatively dry state. Furthermore, it should be appreciated that the liquid is released outwardly from the brewing chamber at a considerable distance above the lower surface of the upper member wall 78 due to the height of the upper member rim 79.

Once nearly all of the liquid has been removed from the brewing chamber 32, the control cam 65 actuates the toggle mechanism cam element 63 causing the spindle shaft 51 to move downwardly whereby the lower member is forced downwardly from the upper member 33 to define an annular separation therebetween. The rotation of the brewing chamber 32 forces the leached coffee grounds outwardly through this separation. Preferably, the lower member only moves downwardly a relatively short distance such as 0.125 inch whereby some of the spent coffee grounds are forced to rub against and wipe the filtering screen 84. In this manner, any coffee grounds which adhere to the filtering screen 84 or any other material which becomes attached thereto is wiped away due to many coffee grounds passing outwardly contiguous with the screen.

For the purpose of delivering the coffee liquid from the brewing chamber 32 to the coffee cup 23 which is disposed on platform 22, a collector ring 87 is positioned around the upper member rim releasing edge 80. The collector ring performs the double function of restraining the outward movement of the coffee liquid, and due to the fact that its bottom is downwardly inclined to a spout 89, the coffee liquid flows by gravity to and through the spout into the coffee cup 23. Positioned below the collector ring 87 is a bowl-shaped waste basin 92 having an inwardly inclined sidewall 93 disposed around the junction between the upper and lower members. When the lower member 34 is moved downwardly while the brewing chamber 32 is rotating, the leached coffee grounds are thrown outwardly against the inwardly inclined side 93 which deflects them downwardly to the bottom of the basin as shown in FIG. 1. Preferably, the basin 92 is fabricated from a suitable plastic and is releasably secured to the collector ring 87 by an interference fit therewith. Therefore, when the user wishes to remove the spent coffee grounds, the waste basin 92 is easily removable from the collector ring 87. Inasmuch as the spent coffee grounds discharged into the waste basin are relatively dry, the storage thereof within the basin does not generate an unpleasant odor. Additionally, since the spent coffee grounds are dry, they are easily removable from the basin 92 by the user.

An important aspect of the present invention is that the coffee liquid is discharged from the brewing chamber at a different elevation from the spent coffee grounds. This factor is important in the collection and separation of the coffee liquid and the spent coffee grounds. As has been described hereinabove, the coffee liquid must travel up an inclined rim 79 which extends away from the separation between the upper and lower members when the coffee grounds are being removed from the brewing chamber.

The preferred operation of coffee maker 20 starts with the control unit rotating the cam 65 causing the toggle mechanism to raise shaft 51 and lower member 34 so that the lower member edge 74 is in sealing engagement with the upper member 33 to close the brewing chamber. Next, a determined amount of coffee grounds to brew a single cup of coffee is fed by the hopper 36 into the brewing chamber through upper member central opening 71. Thereafter, the valve 42 is opened allowing approximately 6 ounces of heated water at in excess of 200° F. to flow into the brewing chamber and to flush into the chamber any coffee grounds which might have adhered to the vanes 72. The heated water and coffee grounds are permitted to steep for approximately seven seconds, whereupon the control unit 39 energizes the electric motor 55 to rotate the brewing chamber 32 at approximately 2200 r.p.m. The rotation of the brewing chamber forces the coffee liquid through the filtering screen 84 and discharge openings 82 and up the outwardly inclined rim 79 to the annular releasing edge 80 where the liquid is hurled outwardly into the collector ring 87 which leads to the discharge spout 89 overhanging a coffee cup on platform 22. The chamber 32 rotates for approximately 30 seconds to insure that nearly all of the liquid is removed from the chamber causing the spent coffee grounds to be relatively dry. Thereafter, the control unit 39, by means of cam 65 and toggle mechanism 62, lowers the shaft 51 and lower member 34 permitting the coffee grounds to be thrown outwardly between the upper and lower members. In passing outwardly, the coffee grounds wipe any particles which might be adhering to the filtering screen 84. The brewing chamber remains in the open position while rotating for about 3 seconds to discharge the coffee grounds and then the cycle is completed as the control unit 39 stops the motor 55.

While there has been shown and described a particular embodiment of the present invention, it will be apparent to those skilled in the art that various modifications may be made without departing from the invention in its broader aspects, and it is, therefore, aimed in the appended claims to cover all such changes and modifications as fall within the true spirit and scope of the present invention.

We claim:

1. A coffee maker comprising a circular brewing chamber having a cup-shaped lower member and an upper member formed with a central opening and at least one discharge opening, a filter element disposed in each of said discharge openings for preventing the passage of coffee grounds therethrough, said upper member being rotatable in a fixed vertical position and said lower member being adapted for downward movement from a position of sealing engagement with said upper member to define a separation therebetween, a coffee hopper means having a depending chute for feeding a measured amount of coffee grounds into said chamber through said central opening and a heater means for gravity-feeding a measured amount of heated water into said chamber through said central opening, means for rotating said chamber whereby the coffee grounds and the heated water combination is forced to the periphery of said coffee maker comprising a sleeve which supports said upper member, a shaft rotatably coupled to said sleeve and slidably disposed within said sleeve and secured to said lower member, a first gear secured to said sleeve and an electric motor means including a worm gear in driving engagement with said first gear and driven by said motor means for rotating said shaft and said sleeve, means for separating said upper and lower members to discharge said coffee grounds through said separation while said shaft is rotating including a toggle means for moving said shaft with respect to said sleeve to effect said separation when coffee grounds are dispelled from said chamber and to close said separation so that said upper and lower members are in sealing engagement when coffee liquid is dispelled through said discharge openings as said shaft rotates, said upper and lower members being shaped to provide a deflection path for said coffee grounds to deflect said coffee grounds against said filter elements with a force sufficient to clean said filter elements when said coffee grounds are discharged through said separation following the discharge of said coffee liquid through said discharge openings, said upper member having an annular rim extending vertically and radially outside of said discharge openings so that the coffee liquid passing through said discharge openings feeds vertically along said rim and is released outwardly from the edge of said rim remote from said discharge openings whereby the liquid is released from said chamber in a plane spaced vertically from the plane in which the coffee grounds are discharged, an annular ring disposed around the release end of said rim for collecting the coffee liquid thrown outwardly from said chamber, said ring having its bottom inclined and leading to a spout whereby the liquid collected in said ring flows by gravity through said spout from said coffee maker and a basin spaced vertically from said annular ring and positioned around said separation defined between said members for collecting coffee grounds when said chamber is opened to discharge said coffee grounds.